United States Patent
Marsden et al.

(10) Patent No.: US 8,039,564 B2
(45) Date of Patent: Oct. 18, 2011

(54) CATALYST PRECURSOR PARTICLES, THEIR PREPARATION AND USE

(75) Inventors: Christine Elizabeth Marsden, Chester (GB); Robert Joseph Parker, Cheshire (GB)

(73) Assignee: PQ Silicas UK Limited, Warrington, Cheshire (GB)

(*) Notice: Subject to any disclaimer, the term of this patent is extended or adjusted under 35 U.S.C. 154(b) by 0 days.

(21) Appl. No.: 12/739,516

(22) PCT Filed: Oct. 15, 2008

(86) PCT No.: PCT/GB2008/003488
§ 371 (c)(1),
(2), (4) Date: Jun. 15, 2010

(87) PCT Pub. No.: WO2009/053672
PCT Pub. Date: Apr. 30, 2009

(65) Prior Publication Data
US 2010/0256314 A1   Oct. 7, 2010

(51) Int. Cl.
*C08F 4/52* (2006.01)
*B01J 21/02* (2006.01)

(52) U.S. Cl. .................... 526/129; 502/204

(58) Field of Classification Search .......... 526/129
See application file for complete search history.

(56) References Cited

U.S. PATENT DOCUMENTS

| | | | |
|---|---|---|---|
| 3,445,367 A | 5/1969 | Kallenbach et al. | |
| 3,484,428 A | 12/1969 | Kallenbach et al. | |
| 3,984,351 A | 10/1976 | Rekers et al. | |
| 3,985,676 A | 10/1976 | Rekers et al. | |
| 4,297,461 A * | 10/1981 | Speca | 526/100 |
| 4,303,770 A * | 12/1981 | Pullukat et al. | 526/96 |
| 4,814,308 A | 3/1989 | Konrad et al. | |
| 5,895,770 A | 4/1999 | Pullukat et al. | |
| 7,271,122 B2 | 9/2007 | Bodart et al. | |
| 7,358,385 B2 * | 4/2008 | Springer et al. | 560/99 |
| 7,638,456 B2 | 12/2009 | McDaniel et al. | |
| 2002/0132941 A1 | 9/2002 | Lange et al. | |

FOREIGN PATENT DOCUMENTS

| | | |
|---|---|---|
| EP | 0055863 A2 | 7/1982 |
| WO | 92/17511 A1 | 10/1992 |
| WO | 98/28348 A1 | 7/1998 |
| WO | 01/87997 A1 | 11/2001 |
| WO | 2005/054315 A1 | 6/2005 |
| WO | 2005/111098 A1 | 11/2005 |

OTHER PUBLICATIONS

International Search Report for PCT/GB2008/003488 dated Jan. 23, 2009 (Form PCT/ISA/210).
Office Action issued for Korean Application No. 10-2010-7011247 dated Feb. 18, 2011 (Korean Translation).
Office Action issued for Korean Application No. 10-2010-7011247 dated Feb. 18, 2011 (English Translation).

* cited by examiner

*Primary Examiner* — David W Wu
*Assistant Examiner* — Sonya Wright
(74) *Attorney, Agent, or Firm* — Michael L. Dever; Buchanan Ingersoll & Rooney PC

(57) ABSTRACT

A method for preparing a catalyst precursor for an olefin polymerization catalyst involves the use of aqueous or alcoholic solutions of a chromium salt and of boric acid and aluminum carboxylate for deposition onto an inorganic support material, such as a silica xerogel. The chromium salt, aluminum carboxylate and boric acid are sufficiently soluble for deposition from a single solution to be effective. The catalyst precursor can be activated by calcination to form a catalyst for homo- or co-polymerisation of α-olefins which has productivity and melt flow index for the resulting polymer or copolymer which is comparable to results obtained with catalysts prepared by prior art organometallic routes. The activation of the catalyst precursor gives reduced levels of toxic or noxious fumes during activation compared to use of organometallic sources of chromium or aluminum.

12 Claims, No Drawings

CATALYST PRECURSOR PARTICLES, THEIR PREPARATION AND USE

CROSS-REFERENCE TO RELATED APPLICATIONS

This application is the United States national phase under 35 U.S.C. §371 of PCT International Application No. PCT/GB2008/003488, filed on Oct. 15, 2008, and claiming priority to Great Britain Application No. 0720983.6, filed on Oct. 26, 2007. Both applications are incorporated by reference herein.

The invention relates to porous inorganic particles, particularly silica particles, carrying chromium and aluminium compounds, and methods for their preparation. The particles, particularly silica particles, may be activated to form catalyst particles for use in the polymerisation of olefins ($\alpha$-alkenes).

Typical activated catalysts for use in the polymerisation of olefins comprise chromium oxide carried on a porous inorganic support. For many uses, it is preferred if aluminium oxide is also present, either as part of the inorganic support itself (for instance where the support is a silica-alumina co-gel support), or also carried, with the chromium oxide, in the pore structure of the porous inorganic support.

The incorporation of mixtures of oxides into the molecular structure of the inorganic support tends to weaken the structure and to make it more difficult to achieve high porosities for the inorganic porous support material. For this reason, it is desirable to carry alumina within the pore structure (i.e. deposited on pore surfaces) of the inorganic porous support material along with the chromium oxide.

U.S. Pat. No. 3,984,351 discloses olefin polymerization catalysts prepared by depositing a chromium compound and an aluminium compound on an inorganic support material and heating the support material in a non-reducing atmosphere at a temperature above 300° C. The resulting material is then combined with a metal or non-metal reducing agent, preferably a boron-containing compound, to provide a catalyst system for use in the polymerization of olefins. Silica xerogels are mentioned as preferred support materials. The catalysts are prepared by depositing chromium and aluminium compounds on the inorganic support. The compounds mentioned are organic compounds and the deposition is from an inert, organic solvent. The disclosed catalyst system provides improved olefin polymer characteristics, such as improved melt indices.

GB 1 575 352 discloses the preparation and use of supported, chromium-containing catalysts for polymerization of one or more $\alpha$-alkenes. In the process disclosed, a chromium 1,3, diketo compound, such as chromium acetyl acetonate, is reacted with an organometallic compound of a Group IIA or Group IIIA metal from the periodic table of elements, with Aluminium or Magnesium preferred. For instance, tri-isobutyl aluminium may be used. The addition of the organometallic compound to the chromium compound solubilises the latter in aliphatic or cycloaliphatic solvents, such as heptane, allowing the use of the resultant solution for impregnation of a porous inorganic support material. The chromium and metal compounds can then be deposited on surfaces within the pore structure of the inorganic support material by evaporation of the solvent. Preferred porous inorganic support materials are silicas.

After solvent removal, the impregnated particles (i.e. inorganic porous support particles impregnated with chromium and metal compounds) need to be activated in order to make them useful as catalyst particles. Generally, the carrier particles are sold and transported in unactivated form (referred to in this specification as unactivated catalyst particles), and require activation prior to being useful as catalyst particles for olefin polymerization. Activation is carried out by heating the unactivated catalyst particles at a high temperature, such as from 200 to 1200° C., for a time from a few seconds, but typically for several hours, in a non-reducing atmosphere such as nitrogen, inert gas or carbon dioxide, or preferably in an oxidising atmosphere such as air or oxygen, such that the chromium is converted to a chromium VI state. Once activated, the catalyst is used at once, or stored in a dry, inert atmosphere until it is used.

The process of GB 1 575 352 allows for the simultaneous impregnation of a porous inorganic carrier material with both chromium and aluminium compounds. However, the method requires that the chromium and aluminium compounds are dissolved in an aliphatic and/or cycloaliphatic solvent, leading to potential flammability and solvent recovery problems when evaporating the solvent following impregnation. Furthermore, the chromium and aluminium compounds present on the unactivated catalyst particles are complex organometallic compounds. When the unactivated catalyst particles are subjected to activation by heating in a non-reducing or oxidising atmosphere, the degradation of these compounds leads to the formation of odorous and potentially toxic fumes, leading to a requirement for containment, scrubbing and emission control. Furthermore, we have found that some solutions of chromium and aluminium compounds have high viscosities, and so are unsuitable for impregnation of the solution into the pore structure of an inorganic porous support material.

WO 99/12978 discloses catalysts prepared by a process comprising a first stage during which a porous inorganic oxide support is impregnated with a chromium compound and a second, optional stage during which the product from the first stage is impregnated with either a titanium or an aluminium compound. The chromium compound is a chromium oxide or a compound, which can be converted to chromium oxide by calcining, such as chromium nitrate, sulphate, carbonate, acetate, acetylacetonate, ammonium chromate or tert-butyl chromate. The aluminium compounds mentioned are acetyl acetate, acetylacetonate, alkoxy or alkyl types. The solvents to be used are not specified, but the aluminium compounds mentioned would not be significantly soluble in polar solvents. There are potential problems, which may arise from carrying out chromium compound impregnation and aluminium compound impregnation as separate steps by a method such as that disclosed in WO 99/12978. The first impregnation, followed by solvent removal, may lead to partial or complete blocking of the pore structure of the inorganic porous carrier material, possibly making it more difficult, or impossible, for a second impregnation to be carried out effectively. Furthermore, even if such pore blocking does not take place, the catalytic behaviour of the mixture of chromium and aluminium may be modified because the chromium and aluminium are not co-mingled at the atomic level in the catalyst precursor. Instead, separate particles of aluminium compound may be deposited onto the chromium compound already present. This may lead to a change in catalyst activity and a possible reduction in the melt index for the polymer produced using the activated catalyst.

U.S. Pat. No. 4,814,308 discloses a supported catalyst laden with chromium, phosphorus and aluminium, each in oxide form, used in combination with a co-catalyst. The supported catalyst is formed by means of impregnating the porous support particles using chromium and aluminium organometallic compounds in an organic solvent. The co-catalyst is lithium alkyl and boronalkyl. A comparative example, using aluminium nitrate, phosphoric acid and chromium nitrate to deposit chromium and aluminium onto a porous silicate carrier, produces a catalyst precursor which, when activated and used for polymerisation of olefins, has low productivity and low melt flow index compared to the organometallic route.

Hence, there is a need for a method for impregnation of chromium and aluminium compounds onto inorganic porous support materials, to form catalyst precursors, which overcomes some or all of the problems of the prior art. There is also a need for the activated catalyst formed from the precursors to give melt flow index and productivity similar to that for prior art catalysts, prepared using organometallic compounds deposited from non-polar solvents, when the activated catalyst is used for homo- or co-polymerisation of olefins.

It is desirable to use an aqueous, or lower aliphatic alcohol, solution of chromium and aluminium compounds for impregnation of the inorganic support material. The use of such solvents, rather than higher aliphatic, non-polar compounds such as heptane, would lead to fewer processing problems associated with solvent removal, such as lower hazards during evaporation, particularly for water as a solvent. Although chromium salts such as nitrate, carboxylates (such as acetates and oxalates) and sulphate are soluble in water, lower aliphatic alcohols or their mixtures, it has been found that dissolution of aluminium compounds along with the chromium compounds in order to form a mixed solution is generally not possible at the concentrations needed for deposition onto an inorganic support. It has also been found that when some soluble aluminium salts are used for deposition of aluminium onto an inorganic catalyst, the resulting activated catalyst, when used for olefin polymerisation, gives reduced HLMI compared to a catalyst prepared from organometallic chromium and aluminium compounds.

Hence there is a need to identify a method for including aluminium, in a dissolved form, in solutions with chromium salts dissolved in water, $C_1$ to $C_4$ aliphatic alcohol, or mixtures thereof, which does not lead to the precipitation of insoluble chromium or aluminium salts. There is also a need to identify a route for deposition of aluminium salts from water, $C_1$ to $C_4$ aliphatic alcohol, or mixtures thereof onto an inorganic carrier, along with chromium salts carried on the same inorganic carrier, such that the resulting activated catalyst has similar properties to prior art catalysts prepared using organometallic compounds deposited from non-polar solvents.

Furthermore, many of the chromium and/or aluminium compounds used in the prior art, particularly organometallic compounds, can produce noxious or toxic fumes during the activation or calcination of catalyst precursor to form activated catalyst. This may require complex fume treatment equipment at the site where the catalyst precursor is activated.

It is an object of this invention, amongst others, to provide a method for preparing catalyst precursors by deposition of chromium and aluminium from solutions based on aqueous or alcoholic solvents. It is also an object of this invention to provide a method for preparing catalyst precursors which avoid the formation of noxious or toxic fumes during catalyst activation. A further object of the invention is to provide catalyst precursors which, when activated, provide catalysts for homo- or co-polymerisation of α-alkenes (olefins) which have activities similar to prior art catalysts prepared by organometallic routes, and which can be used to form polymers with melt indices greater than or equal to values achieved with such prior art catalysts.

Surprisingly, it has now been found that solutions of chromium and/or aluminium compounds in water, $C_1$ to $C_4$ aliphatic alcohol, or mixtures thereof can be prepared with sufficiently high concentrations of chromium and/or aluminium to be useful for coating or for impregnation of an inorganic support material in order to form unactivated catalyst particles (i.e. catalyst precursor particles) comprising chromium and aluminium compounds deposited on the inorganic support material. The solutions can be of sufficiently low viscosity that they can penetrate the pore structure of porous inorganic support materials. The solvent can be easily removed by evaporation to form the catalyst precursor, with reduction in problems relating to loading the atmosphere with volatile organic compounds or flammability, particularly if the solvent is water or includes water. Moreover, the selected compounds are such that their decomposition, along with the decomposition of any residual solvent, during the activation of the catalyst, does not generate toxic or noxious fumes, such as formed by some organometallic compounds and solvents used in the prior art.

Moreover, sequential deposition of chromium then aluminium compounds, or vice versa, yields acceptable catalyst precursors with properties comparable to those where the chromium and aluminium compounds are deposited together.

A first aspect of the invention provides a catalyst precursor for an olefin polymerization catalyst comprising an inorganic support material carrying a chromium salt, aluminium carboxylate and boric acid.

A second aspect of the invention provides a method for preparing a catalyst precursor for an olefin polymerization catalyst according to the first aspect of the invention comprising:
i) providing the inorganic support material,
ii) depositing a chromium salt onto the inorganic support material from a first solution comprising a chromium salt in a solvent which is water, $C_1$ to $C_4$ aliphatic alcohol, or a mixture thereof,
iii) depositing an aluminium carboxylate and boric acid onto the inorganic support material from a second solution comprising an aluminium carboxylate and boric acid in a solvent which is water, $C_1$ to $C_4$ aliphatic alcohol, or a mixture thereof, and
iv) removing solvent to form the catalyst precursor comprising chromium salt, aluminium carboxylate and boric acid.

The chromium salt may be deposited onto the inorganic support material from the first solution, and solvent of the first solution removed, prior to the aluminium carboxylate and boric acid being deposited from the second solution. The process may also be carried out by first depositing the aluminium carboxylate and boric acid from the second solution, then removing the solvent of the second solution, prior to depositing the chromium salt from the first solution.

Preferably, for process simplicity, the method of the second aspect of the invention is effected using a single solution comprising the chromium salt, the aluminium carboxylate and the boric acid.

Hence, a preferred method of the second aspect of the invention comprises the steps of:
i) providing the inorganic support material,
ii) providing a solution comprising chromium salt, aluminium carboxylate and boric acid in a solvent which is water, $C_1$ to $C_4$ aliphatic alcohol, or a mixture thereof,
iii) depositing the solution onto the inorganic support material, and
iv) removing the solvent to form the catalyst precursor comprising chromium salt, aluminium carboxylate and boric acid.

By "removing the solvent" the skilled person would understand that sufficient solvent is removed in order to form an apparently dry, free-flowing and easy-to-transport catalyst precursor. This may mean that some residual solvent may remain as part of the catalyst precursor. For instance, the catalyst precursor may contain up to 15% residual solvent, preferably 10% or less, and still behave as a free-flowing powder. Any such residual solvent will be driven off when the catalyst precursor is activated to form an activated catalyst. Alternatively, the solvent may be substantially fully removed from the catalyst precursor such that no unbound solvent remains after solvent removal.

The preferred aspects and embodiments of the invention detailed below apply to both the first and second aspects of the invention, where appropriate.

By "catalyst precursor" is meant a product, which is suitable for handling and transporting to a site where it can be activated in order to be used as a catalyst, particularly as an olefin polymerisation catalyst. Generally, such catalysts are activated, by means of heating in a non-reducing atmosphere as described hereinbelow, shortly before use. Hence the catalyst precursor is a commercially useful material, which can be used to form catalysts simply by activation or calcination.

The chromium salt is suitably carboxylate, nitrate, sulphate, chloride or a mixture thereof, but any appropriate chromium salt may be used. Chromium sulphates, chlorides or carboxylates are particularly preferred salts, particularly carboxylates, as they do not produce toxic or noxious fumes on activation of the catalyst precursor. Chromium acetate is particularly preferred for this reason and also because of its high solubility in the solvents used in the method of the second aspect of the invention. Suitably, the chromium salt should have a solubility in the solvent such that the solution may comprise at least 1% by weight of chromium expressed as the element, preferably at least 2%, more preferably at least 4%.

Suitably, the inorganic support material is a porous inorganic oxide.

Typically, the inorganic support material is in the form of particles having a weight mean particle diameter from 1 to 300 micrometers. This typical mean diameter, also applies to the catalyst precursor particles and to the activated catalyst particles, which have essentially the same particle diameter as the support material. This may be measured by particle size analysis by light scattering using an apparatus such as a Malvern Mastersizer™ model S, with a 300 RF lens (measurement range 0.05-900 µm), Malvern Mastersizer™ software v. 2.18 and a DIF 2012 dispersion unit. This instrument, made by Malvern Instruments, Malvern, Worcestershire, utilises Mie theory to calculate the particle size distribution. Mie theory predicts how light is scattered by spherical particles and takes into account the refractive index of the particles. The real value used for silica refractive index is 1.4564 and 0.1 for the imaginary refractive index of the particle (the absorption of light), with water dispersant at 1.33 refractive index.

Suitably, the particles have a $d_{90}$ of 500 µm or less, preferably 400 or less. They may have a $d_{50}$ of 300 µm or less. The particles may have $d_{10}$ of 1 µm or more, preferably 10 or more. (For the sake of clarity, $d_{90}$ is the diameter at which 90% by weight of the particles have a diameter less than $d_{90}$—equivalent definitions apply to $d_{50}$ and $d_{10}$). Preferably, the particles have a $d_{50}$ from 1 to 300 µm, more preferably from 5 to 250 µm, even more preferably from 25 to 150 µm.

The particles may be prepared by comminution, optionally combined with size classification by means such as sieving, or the particles may be prepared by a route such as spray-drying.

A further advantage of method of the second aspect of the invention is that the chromium and aluminium are found to be more evenly distributed over particles of varying diameters when the inorganic support material is in particulate form. Prior art methods, such as the method of GB 1 575 352, may lead to smaller particles of inorganic material carrying higher concentrations of the chromium and aluminium, leading to potentially less effective utilisation of the catalytically active surfaces during polymerisation. Also, when the activated catalysts are used to catalyse polymerisation, polymerisation at active sites within the catalysts tends to lead to fragmentation of the support material. This fragmentation of the catalyst particles during polymerisation is an important and advantageous feature as it means that catalyst particles do not have to be removed from the polymer. However, if large, un-fragmented catalyst particles remain in the polymer, these can lead to defect formation in articles formed from the polymer. If large catalyst particles have fewer active sites, this can lead to poor fragmentation of these particles and consequent downstream process defects. The invention provides larger catalyst particles having the same concentration of active sites as smaller particles, assisting with the fragmentation of these larger particles and reducing or eliminating such process defects.

Suitable inorganic support materials include oxides such as silica, alumina, mixed silica-alumina or oxides of zirconium, thorium or magnesium. Oxides of other elements may also be present as part of the atomic lattice structure of the inorganic support material. Suitably, the support material is in the form of an inorganic oxide gel, preferably a silica gel.

When the inorganic support material is a xerogel, the xerogel may be prepared by spray drying, by evaporation of water from a hydrogel, or it may be prepared by removing the water from a hydrogel by solvent exchange with a water-miscible solvent such as, methanol, ethanol, ethyl acetate, isopropyl alcohol or some other suitable solvent, along with removal of the exchanging solvent from the resulting solvent-exchanged gel, for instance by evaporation. Another route for solvent removal is by azeotropic distillation with a partially water-miscible solvent, for instance ethyl acetate. The solvent is added to the hydrogel and the mixture distilled. A solvent rich condensate is returned to the distilling mixture whilst the water rich distillate is discarded, leading to replacement of the water in the hydrogel by the solvent. The resulting gel may then have the solvent removed by evaporation or other suitable means to form a xerogel.

For xerogels prepared by water removal using water evaporation, the process generally leads to lower final pore volumes for the resulting xerogels than would a solvent exchange process to remove water. However, a xerogel prepared by a solvent exchange route is somewhat more prone to partial structural collapse (i.e. loss in porosity) than is a xerogel formed by evaporative drying of a hydrogel, when an aqueous or alcoholic solution (such as the chromium salt and/or aluminium salt solution or solutions of the invention) enters the pore structure.

For spray-drying, typically a hydrogel is comminuted to produce a dispersion in a solvent, usually water, which is fed to a spray dryer to flash off the solvent from slurry droplets by evaporation. This forms agglomerated, typically spheroidal, particles of dried or partially dried gel, depending upon drying conditions. Partially dried gel may be further dried to form xerogel by, for instance, evaporative drying or by solvent exchange as explained above. Other combinations of such processes are possible, for instance by including a further comminution step after spray drying. Freeze-drying is another suitable process, which may be used for the preparation of dried gel (where frozen solvent in solid form, e.g. water as ice, is removed by sublimation under vacuum).

The process of the second aspect of the invention is applicable to highly porous inorganic carriers such as those dried by solvent exchange, azeotropic distillation, or freeze-drying as well as to less porous inorganic carriers with lower porosities such as xerogels prepared by water evaporation.

Hence, it has been found that the process of the second aspect of the invention can produce catalyst precursors, which can be activated to form effective olefin polymerisation catalysts, without the need to use complex solvent removal routes such as solvent exchange in order to produce highly porous silica xerogels. Moreover, xerogels produced by simple water evaporation have been found to be less susceptible to pore collapse than more porous xerogels, produced by complex drying routes, when contacted with an aqueous or alcoholic solution of chromium salt, such as carboxylate and/or aluminium carboxylate for deposition of the salts. Hence the invention also allows for the use of a simple xerogel preparation process along with a solvent or solvents for loading or depositing chromium and aluminium that does not cause pore structure collapse, yet allows for high loading levels of chromium and aluminium, from a solution without excessive risk of noxious, toxic or flammable fumes generated when the solvent in that solution is removed, or when the resulting catalyst precursor is activated by calcination.

It should be emphasised that the second aspect of the invention is also effective when used to form catalyst precursors from xerogels or other inorganic carrier particles made by other routes such as solvent exchange, azeotropic distillation, freeze drying, etc., and is not limited to use with xerogels formed by evaporative drying from a hydrogel.

A suitable porous inorganic support material is a silica xerogel. Other oxides such as titanium or aluminium, or mixtures of such oxides, may be included in the atomic lattice structure of the silica xerogel, but these may also be absent. Suitably, silica xerogels used in the invention comprise at least 90% by weight of $SiO_2$, expressed as percentage by weight of the xerogel. This is because the presence of other oxides may lead to weakening of the silica skeletal structure, making it potentially more difficult to achieve high porosities in the pore structure of the inorganic support material. More preferably, the silica xerogels comprise at least 95% by weight of silica, more preferably at least 98% by weight of silica. $SiO_2$ level in the xerogel is suitably measured by elemental analysis using XRF as detailed below.

In this specification, unless otherwise explained, percentages by weight refer to percentages as measured by elemental analysis using XRF. In other words, percentages are expressed in relation to the total material measured by XRF. The high temperatures used in sample preparation for XRF mean that any volatile materials such as water will have been lost prior to measurement and will not be included. For boron, which is not measurable by XRF, percentages are calculated on the basis of material dried at 500° C. for 4 hours.

Suitably, the inorganic support material has a porosity from 0.5 to 4.0 cm$^3$/g or 0.5 to 3.0 cm$^3$/g, preferably from 1.0 to 3.0 cm$^3$/g or 0.8 to 2.5 cm$^3$/g, more preferably from 1.0 to 2.0 cm$^3$/g.

Suitably the surface area of the inorganic support material is from 100 to 1000 m$^2$/g, for instance from 200 to 800 m$^2$/g, preferably from 200 to 700 m$^2$/g, for instance from 250 to 700 m$^2$/g, more preferably from 250 to 500 m$^2$/g. The surface area, along with pore volume, is measured by nitrogen porosimetry using an ASAP2420 analyser (supplied by Micromeritics Ltd, Dunstable, Bedfordshire UK). Samples are first outgassed at 270° C. for at least 1 hour on the instrument's outgassing station prior to measurement. The sample tube (containing the outgassed sample) is transferred to the analysis station, submerged in liquid nitrogen and a nitrogen isotherm determined. A multipoint surface area is calculated using BET theory taking data points in the $P/P_0$ range 0.08 to 0.20. A pore volume measurement is recorded at $P/P_0$ of 0.98 on the desorption leg.

When porosity and surface area measurements are carried out on the catalyst precursors, these have been held in air at 500° C. for 4 hours prior to measurement.

The second aspect of the invention may also be put into effect by using a solution comprising chromium salt, aluminium carboxylate and boric acid in a solvent which is water, $C_1$ to $C_4$ aliphatic alcohol, or a mixture thereof as the solvent used in a solvent exchange process to remove water from a hydrogel of the inorganic support material. The exchanged and hence loaded gel may then be heated to evaporate solvent and form the catalyst precursor, loaded with chromium salt, aluminium carboxylate and boric acid. This process is suitable for use with hydrogels such as silica hydrogels, and gives the advantage that no additional drying step is needed, such as is required when organometallic compounds are used in organic solvents for impregnation.

In another method for putting the second aspect of the invention into effect, the inorganic support material may be substantially free of unbound solvent prior to carrying out the method of the second aspect of the invention. By unbound solvent is meant solvent, which can be removed by heating the inorganic support material in a vacuum oven at 140° C. for 1 hour.

The chromium salt, the aluminium carboxylate and the boric acid are suitably carried within a pore structure of the inorganic support material.

This may be achieved, for instance, by spraying a solution comprising the chromium salt, the aluminium carboxylate and the boric acid, in a solvent, onto the porous inorganic support material, followed by the removal of the solvent. For instance, if the porous inorganic support material is in particulate form, the particles may be tumbled in a mixer, such as a double cone blender, whilst the solution is sprayed onto them. Subsequently, the particles may be dried in an oven or using a fluidised bed apparatus, or passed through a flash drier to remove solvent. Another method would be to spray the solution onto fluidised particles in a heated, fluidised bed, whereby loading of the materials to the pore structure takes place concurrently with the solvent removal. Other methods are also suitable, such as dispersing the particulate material in an excess of solution, filtering to remove the excess solution and then heating the particles by a suitable means, such as an oven or in a fluidised bed apparatus, in order to remove the solvent. Preferably, incipient wetting of porous carrier particles is used as the impregnation method, with the solution being drawn into the pore structure of the carrier particles by capillary forces. When the method of the invention is carried out using two solutions (a first chromium salt solution and a second solution comprising aluminium carboxylate and boric acid), the same process routes detailed above may be used for the first solution, followed by repetition of the process for impregnation with the second solution (or vice versa).

By carboxylate is meant a salt of an alky carboxylate. Suitable alkyl carboxylates include mono-, di-, and tri-carboxylic acids with 6 or fewer carbon atoms per molecule, preferable 4 or fewer, more preferably 2 or fewer. Such carboxylates have been found to decompose upon activation of the catalyst precursor without excessive formation of noxious or toxic fumes.

Preferred monocarboxylates include formate, acetate, lactate and propionate. Preferred dicarboxylates include oxalate, malate, maleate, malonate, glutarate, succinate and a preferred tricarboxylates is citrate. Mixtures of carboxylates may also be employed.

Preferably, when the chromium salt is a carboxylate it is chromium acetate. Preferably, the aluminium carboxylate is aluminium acetate.

It has been found that the presence of boric acid with the aluminium carboxylate enhances the solubility of the aluminium carboxylate in the aqueous and/or alcoholic solution, and does not lead to precipitation of the aluminium carboxylate at the concentrations needed for deposition onto the inorganic support material from the solution. It has been found that the presence of boric acid in a solution of the chromium salt and aluminium carboxylate enhances the solubility of the aluminium carboxylate in the aqueous and/or alcoholic solution, and does not lead to precipitation of the chromium salt or of the aluminium salt, hence facilitating the loading of the inorganic support material from the solution. This leads to the inorganic support material also carrying boric acid after removal of the solvent.

The levels of salts present in solution will be selected in the light of the pore volume of the inorganic support material in order to obtain desired loading levels for the catalyst precursor and the eventual activated catalyst. The levels needed will depend upon the impregnation method used and the porosity of the inorganic support material. The solution comprising chromium salt, aluminium carboxylate and boric acid suitably comprises from 0.05% to 2% by weight of chromium expressed as the element, for instance from 0.1% to 1%. The solution suitably comprises from 0.1% to 4% by weight of aluminium expressed as the element, for instance from 0.2% to 2%. The solution suitably comprises from 0.01% of 0.4% by weight of boron expressed as the element, for instance from 0.02% to 0.2%. The upper level of the chromium, aluminium or boron in the solution is not particularly important. Suitably, the ratio of aluminium to boron in the solution, expressed as aluminium/boron by weight, is from 50/1 to 3/1, preferably from 40/1 to 4/1, more preferably from 30/1 to 5/1. Suitably, the ratio of aluminium to chromium in the solution, expressed as aluminium/chromium by weight, is from 25/1 to 1/2, preferably from 8/1 to 2/3, more preferably from 4/1 to 1/1. When separate solutions are used for the chromium salt and for the aluminium carboxylate and boric acid, the same typical and preferred levels as detailed above are used.

A suitable means for incorporating boric acid into the solution involves the use of commercially available basic aluminium acetate stabilized with boric acid as the source of the aluminium carboxylate of the invention. Preferably, boric acid stabilised basic aluminium acetate is used as a source of aluminium carboxylate and of boric acid for the invention. This material is commercially available, for instance, from Sigma Aldrich in the form of a white powder typically comprising from 16 to 20% by weight of aluminium and 2.5% by weight of boron expressed as the elements.

The catalyst precursor of the first aspect of the invention, or prepared by the second aspect of the invention, suitably comprises, as carried material, typically deposited on the surfaces of the catalyst precursor, from 0.01 to 3% by weight of chromium expressed as the element, preferably from 0.1 to 2%, more preferably from 0.25 to 1.5%. The catalyst precursor suitably comprises, as carried material, typically deposited on the surfaces of the catalyst precursor, from 0.1 to 8% of aluminium expressed as the element, preferably from 0.2 to 4%, more preferably from 0.5 to 2.5%. The catalyst precursor suitably comprises, as carried material, typically deposited on the surfaces of the catalyst precursor, from 0.005 to 2% of boron expressed as the element, preferably from 0.05 to 0.5%, more preferably from 0.1 to 0.3% by weight. The term "on the surfaces" is meant to include the surfaces within any pore structure of the catalyst precursor in addition to any external surfaces. The levels of chromium and aluminium are suitably measured by means of XRF (X-ray fluorescence) using a Phillips PW2400 Instrument. Samples for analysis are prepared as fused beads using a lithium borate flux. Fusion is typically between 1000° C. and 1250° C.

Boron, which cannot be measured by XRF, is suitably measured in solution using ICP (Inductively Coupled Plasma) spectrometry. Typically an extract is generated by adding 10 cm$^3$ of nitric acid to 1 g of catalyst sample, boiling and subsequently diluting to 250 cm$^3$. Prior to analysis of the solution by ICP this extract is filtered using a 0.45 μm filter. Boron values are determined by comparison with boron standards in a matched acid matrix using a Varian Inductively Coupled Plasma—Optical Emission Spectrometer (ICP-OES). The value obtained is corrected to a dry basis value by measuring weight equilibrium weight loss at 500° C. for a catalyst precursor sample of the same provenance. The boron level is expressed as weight of boron relative to the weight of 500° C-dried material.

The amounts of chromium, aluminium and boron present as carried material (i.e. typically deposited on the surfaces of the catalyst precursor) are determined by comparison with the measured levels in the inorganic support material prior to impregnation to form the catalyst precursor. The levels present as carried material are obtained by subtraction of any contribution from Cr, Al or B already within the structure of the inorganic support material. The terms "present as carried material" and "deposited on the surfaces" includes material on surfaces contained within any pore structure of the inorganic support material.

The solvent used for providing the solution of chromium salt, aluminium carboxylate and boric acid is preferably water, a $C_1$ to $C_4$ aliphatic alcohol, or a mixture thereof. This is in order to avoid noxious, flammable or toxic fumes when the solvent is removed. Water, methanol, ethanol, isopropanol and mixtures thereof are preferred solvents, with water, methanol and ethanol and their mixtures particularly preferred and water, methanol and mixtures thereof especially preferred. Water is particularly useful because of its lack of toxicity and flammability. Other solvents may also be used or incorporated into the preferred solvents at levels such that they do not interfere with the performance of the invention.

Preferably, the solvent is removed by evaporation in order to leave the chromium salt, aluminium carboxylate and boric acid deposited in the inorganic support material. As explained above, "removal" means that sufficient solvent is removed such that a free-flowing and easily-transportable catalyst precursor is obtained, and as much as 15% or 10% or less by weight of solvent may still be present expressed as percent by weight of the catalyst precursor, after solvent removal. Alternatively, solvent may be substantially removed such that there is no unbound solvent. By unbound solvent is meant solvent, which can be removed by heating the inorganic support material in a vacuum oven at 140° C. for 1 hour.

A third aspect of the invention provides an olefin polymerisation catalyst obtained or obtainable by heating a catalyst precursor according to the first aspect of the invention or prepared by the method of the second aspect of the invention in a non-reducing atmosphere at a temperature from 200 to 1200° C., preferably from 300 to 1100° C., more preferably from 400 to 900° C. for a time period from 30 minutes to 15 hours, preferably up to 8 hours, more preferably up to 6 hours.

Preferably, the non-reducing atmosphere is an oxygen-containing atmosphere such as air or oxygen or mixtures thereof. This process is known as activation or calcination of the catalyst precursor in order to form the active olefin polymerisation catalyst.

For catalysts of the prior art, particularly those where the catalyst precursor was loaded with organometallic chromium and aluminium compounds delivered from aliphatic solvents, this activation process could lead to the formation of noxious and/or toxic volatile components as the chromium and aluminium compounds decomposed during the activation process. The present invention avoids the formation of such undesirable by-products of activation.

Typically, the activated olefin polymerisation catalyst comprises levels of chromium, aluminium and boron, as carried material, similar to the preferred levels detailed above for the catalyst precursor. The measurement techniques for Cr, Al and B involve pre-treatment before or during analysis such that the measured levels for catalyst precursor and activated catalyst are substantially the same. Thermally activated diffusion during the activation/calcination process for the catalyst may lead to the carried Al, Cr diffusing into the structure of the inorganic support material, rather than being present on its surfaces. The levels of chromium and aluminium are suitably measured by means of XRF as detailed above. Boron is also measured as detailed above. The amounts present as carried material on the catalyst are obtained by subtraction of the measured amounts Cr, Al and B already in the inorganic support material prior to impregnation to form a catalyst precursor.

A fourth aspect of the invention is concerned with a method for polymerisation of one or more $C_2$ to $C_8$ α-alkenes characterized in that the polymerisation is carried out in the presence of an olefin polymerisation catalyst according to the third aspect of the invention. Mixtures of alkenes or alkenes in combination with other monomers may be employed. The use of the catalysts prepared using the methods of the invention and from the catalyst precursors of the invention, is not particularly restricted to alkene polymerisation, but it is particularly suitable for that purpose. Co-catalysts may be used in combination with the catalysts prepared from the precursors of the invention or by the method of the invention. Typically, after activation of the catalyst, it is cooled to ambient temperature and stored ready for use in polymerization. The catalyst prepared using invention may be used in a variety of homo- or co-polymerisation routes, for instance for the production of polyethylenes, by process routes such as solution, slurry-loop, solution CSTR (continuous flow stirred tank) or gas phase polymerisation.

Specific embodiments of the present invention will now be described, by way of example only.

EXAMPLES

In the examples detailed below, high load melt index (HLMI) and melt index (MI) were determined in accordance with ASTM D-1238 using loads of 21.6 kg and 2.16 kg respectively at 190° C.

The silica xerogel support materials used were found to contain no measurable amounts of chromium, aluminium or boron, measured by the methods detailed hereinbefore, prior to carrying out the deposition experiments detailed below.

Example 1

Comparative—Organometals from Heptane—Homopolymerization—700° C.

100 g of a silica xerogel support (pure silica) was prepared by evaporative drying of a hydrogel. The support had a surface area and pore volume by nitrogen porosimetry, measured as detailed above, using a Micromeritics ASAP 2420 analyser, of 381 $m^2/g$ and 1.76 $cm^3/g$.

The support particles had the following particle diameter distribution measured using a Malvern Mastersizer™: $d_{90}$ of 169.3 μm, $d_{50}$ of 114.6 μm and $d_{10}$ of 63.4 μm. ($d_{90}$ is the diameter at which 90% by weight of the particles have a diameter less than $d_{90}$—equivalent definitions apply to $d_{50}$ and $d_{10}$)

100 g of the silica xerogel support (pre-dried at 140° C.) was added to a dry reaction flask fitted with a stirrer. 600 $cm^3$ of heptane were added to the flask to form a silica/heptane slurry. 6.78 g chromium acetylacetonate is added to another clean dry flask containing a magnetic stirrer. 50 $cm^3$ of heptane was added to the chromium acetylacetonate and 64.3 $cm^3$ of triisobutyl aluminium solution (1.0 Molar solution in heptane) added to the stirred chromium acetylacetonate slurry. This reaction mixture was allowed to cool. Thereafter the Cr/Al complex solution was transferred to the flask containing silica and heptane. The resulting slurry was stirred for a further hour and then 6.4 $cm^3$ methanol was added to the slurry. Stirring was stopped and catalyst precursor particles were allowed to settle. The slurry was filtered to remove excess heptane and the residual filter-cake, which was wet with solvent, dried in a vacuum oven at 140° C. to give a free flowing green powder. The resulting catalyst precursor contained 1.06% chromium and 1.76% aluminium expressed as the respective elements. Surface area and pore volume were determined for the catalyst precursor using the ASAP 2420 instrument, and were 358 $m^2/g$ and 1.66 $cm^3/g$ respectively.

10 g of this catalyst precursor was activated in a fluidised bed reactor using dry air as the fluidisation gas. The temperature was held at 700° C. for 5 hours before cooling and switching to nitrogen. 0.148 g of activated catalyst was transferred to a 5 liter isobutane slurry polymerization reactor and tested under homopolymerization conditions using ethylene. Total reactor pressure was 40.3 atm and ethylene partial pressure 16.0 atm. The reactor was maintained at 104° C. 370 g polyethylene was produced and a catalyst activity was calculated as 2640 g/g/hr. The polymer had a melt index (MI) of 0.22 g/10 min, a high load melt index (HLMI) of 19.7 g/10 min and density of 0.9611 $g/cm^3$.

Example 2

According to the Invention—Homopolymerization—700° C.

A methanolic solution of chromium acetate and aluminium acetate was prepared by adding 1.15 g chromium acetate and 2.84 g of boric acid stabilised basic aluminium acetate to a beaker containing a magnetic stirrer. Approximately 50 $cm^3$ of methanol were added and the composition was stirred for 1 hour such that all chromium and aluminium salts were dissolved. This chromium aluminium solution was added to 30 g of the dried silica xerogel support as used in Example 1, such that the chromium and aluminium species were impregnated into the support. Methanol was removed from the thus-formed catalyst precursor by drying in a vacuum oven at 140° C. for 3 hours. The resulting blue/green catalyst precursor powder had chromium and aluminium contents of 0.93% and 1.87% by weight expressed as the respective element. Boron content was determined at 1720 ppm by weight. The surface area and pore volume determined using the Micromeritics ASAP 2420 were 364 $m^2/g$ and 1.67 $cm^3/g$ respectively.

10 g of this catalyst precursor was activated in a fluidised bed reactor using dry air as the fluidisation gas. The temperature was held at 700° C. for 5 hours before cooling and switching to nitrogen.

0.172 g of activated catalyst was transferred to a 5 liter isobutane slurry polymerization reactor and tested under homopolymerization conditions (i.e. using ethylene as monomer) as for Example 1. Total reactor pressure was 40.3 atm and ethylene partial pressure 16.0 atm. The reactor was maintained at 104° C. 431 g polyethylene was produced and activity calculated at 2839 g/g/hr. The polymer had MI of 0.22 g/10 min, HLMI of 19.4 g/10 min and density of 0.9606 g/cm$^3$.

Example 3

Comparative—Sequentially Cr then Al Impregnation—Homopolymerization—700° C.

An aqueous solution of chromium acetate was prepared by diluting a chromium acetate solution containing 7.68% by weight of chromium with a further 2201 cm$^3$ of water. This solution was added to 1500 g of silica xerogel as detailed in Example 1. Water was removed to yield a free flowing catalyst with a chromium content of 0.97%. Surface area and pore volume were 380 m$^2$/g and 1.62 cm$^3$/g (ASAP 2420).

70 g of this Cr-containing silica was pre-dried at 140° C. for 4 hours and placed in a sealed flask. 250 cm$^3$ of heptane was added. Under a nitrogen purge 43 cm$^3$ of 1.0 Molar triisobutyl aluminium solution in heptane was added. After stirring for 30 minutes the composition was filtered and the resulting filtercake dried in a vacuum oven at 140° C. The pale blue/green catalyst precursor powder generated had chromium and aluminium contents of 0.95 and 1.71% expressed as the respective elements. Surface area and pore volume for the catalyst precursor measured using the ASAP 2420 were 375 m$^2$/g and 1.61 cm$^3$/g.

10 g of this catalyst was activated in a fluidised bed reactor using dry air as the fluidisation gas. The temperature was held at 700° C. for 5 hours before cooling and switching to nitrogen.

0.172 g of activated catalyst was transferred to a 5 liter isobutane slurry polymerization reactor and tested under homopolymerization conditions as used for Example 1. Total reactor pressure was 39.9 atm and ethylene partial pressure 15.9 atm. The reactor was maintained at 104° C. 447 g polyethylene was produced and activity calculated at 2997 g/g/hr. The polymer had MI of 0.14 g/10 min, HLMI of 14.4 g/10 min and density of 0.9602 g/cm$^3$.

Example 4

According to the Invention—Copolymerization—600° C. Activation

An aqueous solution of chromium acetate and aluminium acetate was prepared by adding 33.5 g chromium acetate and 96.4 g of boric acid stabilised basic aluminium acetate to a beaker. Approximately 1.44 liters of water was added and the composition stirred for 1 hour such that all chromium and aluminium salts were dissolved. This chromium aluminium solution was added to 1 kg of silica support having a surface area of 377 m$^2$/g and pore volume of 1.75 cm$^3$/g, both parameters determined using the ASAP 2420 instrument.

Water was removed from the resulting catalyst precursor yielding a blue/grey catalyst powder which had chromium and aluminium contents of 1.00% and 1.98% by weight of the respective elements. Boron content was determined at 2130 ppm. The surface area and pore volume determined using ASAP 2420 were 354 m$^2$/g and 1.63 cm$^3$/g respectively. Particle diameter distribution was determined for this catalyst by Malvern Mastersizer™ which indicated: $d_{10}$ of 75.1 μm, $d_{50}$ of 126 μm and $d_{90}$ of 180.6 μm. 10 g of this catalyst precursor was activated in a fluidised bed reactor using dry air as the fluidisation gas. The temperature was held at 600° C. for 5 hours before cooling and switching to nitrogen.

0.180 g of activated catalyst was transferred to a 5 liter isobutane slurry polymerization reactor and tested under copolymerization conditions with 15 cm$^3$ hexene. Total reactor pressure was 40.1 atm and ethylene partial pressure 15.8 atm. The reactor was maintained at 100° C. 468 g of copolymer was produced and activity calculated at 2643 g/g/hr. The copolymer had HLMI of 10.8 g/10 min and density of 0.9487 g/cm$^3$.

Example 5

Comparative—no Al—Copolymerization—600° C. Activation

An aqueous solution of chromium acetate was prepared by adding 33.5 g chromium acetate to a beaker. Approximately 1.44 liters of water was added and the composition stirred for 1 hour such that all chromium acetate was dissolved. This chromium solution was added to 1 kg of silica support as described in Example 4.

Water was removed from the resulting catalyst precursor yielding a blue/grey catalyst powder which had a chromium content of 1.03%. The surface area and pore volume determined using ASAP 2420 were 376 m$^2$/g and 1.69 cm$^3$/g respectively. Particle diameter distribution was determined for this catalyst by Malvern Mastersizer™ which indicated: $d_{10}$ of 75.4 μm, $d_{50}$ of 126.2 μm and $d_{90}$ of 181.3 μm. 10 g of this catalyst precursor was activated in a fluidised bed reactor using dry air as the fluidisation gas. The temperature was held at 600° C. for 5 hours before cooling and switching to nitrogen.

0.178 g of activated catalyst was transferred to a 5 liter isobutane slurry polymerization reactor and tested under copolymerization conditions with 15 cm$^3$ hexene. Total reactor pressure was 40.0 atm and ethylene partial pressure 15.8 atm. The reactor was maintained at 100° C. 459 g of copolymer was produced and activity calculated at 2630 g/g/hr. The copolymer had HLMI of 5.7 g/10 min and density of 0.9466 g/cm$^3$.

Example 6

According to Invention—Copolymerization—600° C. Activation

A methanolic solution of chromium acetate and aluminium acetate was prepared by adding 5.14 g chromium acetate and 13.67 g of boric acid stabilised basic aluminium acetate to a beaker containing a magnetic stirrer.

Approximately 240 cm$^3$ of methanol was added and the composition stirred for 1 hour such that all chromium and aluminium salts were dissolved. This chromium aluminium solution was added to 150 g of silica support having a surface area of 383 m$^2$/g and pore volume of 1.75 cm$^3$/g, both parameters determined using ASAP2420 instrument, such that the chromium and aluminium species were impregnated into the silica. The excess methanol was removed from the catalyst by drying in a vacuum oven at 140° C. for 3 hours. The resulting blue/grey catalyst powder had chromium and aluminium contents of 1.03% and 1.92% by weight of the respective elements. Boron content was determined at 1600 ppm. The surface area and pore volume determined using ASAP 2420 were 361 m$^2$/g and 1.63 cm$^3$/g respectively. Particle diameter distribution was determined by Malvern Mastersizer™ and indicated d$_{10}$ of 65.5 μm, d$_{50}$ of 118.4 μm and d$_{90}$ of 176.4 μm.

10 g of this catalyst was activated in a fluidised bed reactor using dry air as the fluidisation gas. The temperature was held at 600° C. for 5 hours before cooling and switching to nitrogen.

0.193 g of activated catalyst was transferred to a 5 liter isobutane slurry polymerization reactor and tested under copolymerization conditions with 15 cm$^3$ hexene. Total reactor pressure was 40.0 atm and ethylene partial pressure 15.8 atm. The reactor was maintained at 100° C. 490 g of copolymer was produced and activity calculated at 2340 g/g/hr. The copolymer had HLMI of 8.6 g/10 min and density of 0.9503 g/cm$^3$.

Example 7

Comparative—Organometals from Heptane—Copolymerization—600° C. Activation 150 g silica support (predried at 140° C.) with a surface area and pore volume by ASAP 2420 of 393 m$^2$/g and 1.73 cm$^3$/g respectively, were added to a dry reaction flask fitted with a stirrer. 900 cm$^3$ of heptane were added to the flask to form a silica/heptane slurry. 9.51 g chromium acetylacetonate was added to another clean dry flask containing a magnetic stirrer. 80 cm$^3$ of heptane was added to the chromium acetylacetonate and 100.1 cm$^3$ of 1.0 molar triisobutyl aluminium solution in heptane was added to the stirred chromium acetylacetonate slurry. This reaction mixture was allowed to cool. Thereafter the Cr/Al complex solution was transferred to the flask containing silica and heptane. The resulting slurry was stirred for a further hour and then 9.6 cm$^3$ methanol was added to the slurry. Stirring was stopped and catalyst particles were allowed to settle. The slurry was filtered to remove excess heptane and the residual solvent wet filter-cake dried in a vacuum oven at 140° C. to give a free flowing green powder. The resulting catalyst precursor contained 0.99% by weight chromium and 1.86% by weight aluminium as the respective elements. Surface area and pore volume were determined using an ASAP 2420 instrument and were 375 m$^2$/g and 1.63 cm$^3$/g respectively.

10 g of this catalyst precursor was activated in a fluidised bed reactor using dry air as the fluidisation gas. The temperature was held at 600° C. for 5 hours before cooling and switching to nitrogen.

0.190 g of activated catalyst was transferred to a 5 liter isobutane slurry polymerization reactor and tested under copolymerization conditions (15 cm$^3$ hexene). Total reactor pressure was 40.1 atm and ethylene partial pressure 15.9 atm. The reactor was maintained at 100° C. 484 g of copolymer was produced and the activity was calculated at 2215 g/g/hr. The copolymer had HLMI of 8.0 g/10 min and density of 0.9508 g/cm$^3$.

Example 8

Comparative—Chromium and Aluminium Nitrates Used—Copolymerization—600° C. Activation A methanolic solution of chromium nitrate and aluminium nitrate was prepared by adding 7.54 g Cr(NO$_3$)$_3$.9H$_2$O and 25.71 g Al(NO$_3$)$_3$.9H$_2$O to a beaker containing a magnetic stirrer. Approximately 143 cm$^3$ of methanol was added and the composition stirred for 1 hour such that all chromium and aluminium salts were dissolved. The chromium/aluminium solution was added to 100 g silica having a surface area of 377 m$^2$/g and pore volume of 1.75 cm$^3$/g, both parameters determined using an ASAP2420 instrument.

The excess methanol was removed from the catalyst precursor by drying in a vacuum oven at 140° C. for 3 hours. The resulting blue/green catalyst precursor had chromium and aluminium contents of 1.06% and 1.96% by weight of the respective elements. The surface area and pore volume determined for the precursor using ASAP2420 were 362 m$^2$/g and 1.64 cm$^3$/g respectively.

Particle size distribution was determined by Malvern Mastersizer™ and indicated d$_{10}$ of 73.8 μm, d$_{50}$ of 125.2 μm and d$_{90}$ of 180.4 μm.

10 g of this catalyst was activated in a fluidised bed reactor using dry air as the fluidisation gas. The temperature was held at 600° C. for 5 hours before cooling and switching to nitrogen.

0.185 g of activated catalyst was transferred to a 5 liter isobutane slurry polymerization reactor and tested under copolymerization conditions (using 15 cm$^3$ hexene). Total reactor pressure was 40.1 atm and ethylene partial pressure 16.0 atm. The reactor was maintained at 100° C. 485 g of copolymer was produced and activity calculated at 2666 g/g/hr. The copolymer had HLMI of 6.4 g/10 min and density of 0.9508 g/cm$^3$.

Example 9

Comparative—Organometals from Heptane 100 g of a silica xerogel support (pure silica) was prepared by freeze drying of a hydrogel. The support had a surface area and pore volume by nitrogen porosimetry, measured as detailed above, using a Micromeritics ASAP 2420 analyser, of 321 m$^2$/g and 2.32 cm$^3$/g.

The support particles had the following particle diameter distribution measured using a Malvern Mastersizer™: d$_{90}$ of 182.8 μm, d$_{50}$ of 76.5 μm and d$_{10}$ of 12.9 μm. 25 g of the silica xerogel support (pre-dried at 140° C.) was added to a dry reaction flask fitted with a stirrer. 150 cm$^3$ of heptane were added to the flask to form a silica/heptane slurry. 1.82 g chromium acetylacetonate was added to another clean dry flask containing a magnetic stirrer. 20 cm$^3$ heptane was added to the chromium acetylacetonate and 17.3 cm$^3$ of 1.0 Molar solution of triisobutyl aluminium in heptane was added to the stirred chromium acetylacetonate slurry. This reaction mixture was allowed to cool. Thereafter the Cr/Al complex solution was transferred to the flask containing silica and heptane. The resulting slurry was stirred for a further hour and then 1.7 cm$^3$ methanol was added to the slurry. Stirring was stopped and catalyst precursor particles were allowed to settle. The slurry was filtered to remove excess heptane and the residual filter-cake, which was wet with solvent, dried in a vacuum oven at 140° C. to give a free flowing green powder. The resulting catalyst precursor contained 1.05% chromium and 1.73% aluminium expressed as the respective elements. Surface area and pore volume were determined for the catalyst precursor using the ASAP 2420 instrument, and were 301 m$^2$/g and 2.21 cm$^3$/g respectively.

Example 10

According to the Invention

A methanolic solution of chromium acetate and aluminium acetate was prepared by adding 1.07 g chromium acetate and 2.85 g of boric acid stabilised basic aluminium acetate to a beaker containing a magnetic stirrer.

Approximately 74 cm$^3$ of methanol were added and the composition was stirred for 1 hour such that all chromium and aluminium salts were dissolved. This solution of chromium acetate, aluminium acetate and boric acid was added to 30 g of the silica xerogel support as used in Example 9, such that the chromium, aluminium and boron species were impregnated into the support. Methanol was removed from the thus-formed catalyst precursor by drying in a vacuum oven at 140° C. for 3 hours. The resulting blue/green catalyst precursor powder had chromium and aluminium contents of 0.96% and 1.76% by weight expressed as the respective element. Boron content was determined at 1380 ppm by weight (0.138%). The surface area and pore volume determined using the Micromeritics ASAP 2420 were 306 m²/g and 2.13 cm³/g respectively.

It should be noted that Examples 1 to 3 all concerned equivalent homopolymerisation at 700° C. with catalysts having similar particle sizes, pore volumes, surface areas and similar loadings of Cr and Al. Example 1 was a catalyst prepared according to the prior art. Example 2, using a catalyst prepared according to the invention, gave homopolymer density and the melt indices which were similar to those resulting from use of the prior art catalyst. Example 3, in which the catalyst was prepared by deposition of Cr from aqueous solution followed by deposition of Al by an organometallic route, yielded a homopolymer where the melt indices were considerably lower than for examples 1 or 2, demonstrating the different nature of the catalyst prepared by this route using. The activation of the catalyst for example 1 also led to the formation of noxious fumes.

Examples 4 to 8 were all concerned with copolymerisation at 600° C. Once again, the particle sizes, surface areas and pore volumes for the catalysts were substantially the same, as were the Cr and Al loadings, save for Example 5 where only Cr was present (no Al). Example 7 (comparative) corresponded to the use of a catalyst prepared according to the prior art using an organometallic route. It yielded a copolymer of HLMI value 8.0. Examples 4 and 6 used catalysts prepared by embodiments of the method of the invention, with Cr/Al deposited from aqueous, methanol and aqueous solutions respectively. These gave HLMI values of 10.8 and 8.6 respectively, showing that catalysts prepared according to the invention can match or exceed the HLMI values for the prior art catalysts. Example 5 (comparative), without aluminium, did not give the required HLMI value of 8.0 or more. Nor did Example 8 (comparative), where the catalyst was prepared using deposition of chromium and aluminium nitrates from methanolic solution, yield an adequate HLMI (the value was only 6.4). Furthermore, the activation of the catalysts for Examples 7 and 8 led to noxious fume formation.

Examples 9 and 10 relate to an embodiment of the method of the second aspect of the invention to form catalyst precursors on high porosity inorganic carriers, which have been made by a freeze-drying route. Although there is a small reduction in porosity arising from the application of the method, it is clear that the method is still applicable to such high porosity carriers without collapse of the carrier.

Hence it can be seen that activated catalysts prepared using precursors according to the invention give the same or higher melt indices for polymers as prior art catalysts prepared from precursors made by a conventional organometallic route. Also, the catalysts have similar activities, but do not result in noxious fume formation during catalyst activation from the catalyst precursors of the invention. Furthermore, the method of the invention does not lead to a substantial loss in porosity for the resulting catalyst precursor compared to prior art methods for precursor formation.

It should be appreciated that modifications to the examples could be made without departing from the scope of the invention as defined in the appended claims. For instance, the xerogel support could be prepared by milling a hydrogel to form an aqueous slurry, followed by spray-drying rather than by direct evaporative drying of a hydrogel.

The invention claimed is:

1. A method for preparing a catalyst precursor for an olefin polymerization catalyst, the catalyst precursor comprising an inorganic support material carrying a chromium salt, aluminium carboxylate and boric acid, the method comprising
   i) providing an inorganic support material,
   ii) depositing a chromium salt onto the inorganic support material from a first solution comprising a chromium salt in a solvent which is water, $C_1$ to $C_4$ aliphatic alcohol, or a mixture thereof,
   iii) depositing an aluminium carboxylate and boric acid onto the inorganic support material from a second solution comprising an aluminium carboxylate and boric acid in a solvent which is water, $C_1$ to $C_4$ aliphatic alcohol, or a mixture thereof, and
   iv) removing solvent to form the catalyst precursor comprising chromium salt, aluminium carboxylate and boric acid, wherein the inorganic support material is a silica xerogel comprising at least 90% by weight of $SiO_2$.

2. The method of claim 1 wherein the chromium salt is carboxylate, sulphate, chloride or a mixture thereof.

3. The method of claim 1 wherein the chromium salt is acetate.

4. The method of claim 1 wherein the inorganic support material is in the form of particles having a weight mean particle diameter from 1 to 300 micrometers.

5. The method of claim 1 wherein the silica xerogel is prepared by evaporation of water from a silica hydrogel.

6. The method of claim 1 wherein the catalyst precursor comprises the chromium salt, aluminium carboxylate and boric acid within a pore structure of the inorganic support material.

7. The method of claim 1 wherein the aluminium carboxylate is aluminium acetate.

8. The method of claim 1 wherein the catalyst precursor comprises, as carried material, from 0.01 to 3% by weight of chromium expressed as the element, from 0.1 to 8% of aluminium expressed as the element and from 0.005 to 2% of boron expressed as the element.

9. The method of claim 1 wherein the chromium salt is deposited onto the inorganic support material from the first solution, and solvent is removed prior to the aluminium carboxylate and boric acid being deposited onto the inorganic support material from the second solution.

10. The method of claim 1 wherein the aluminium carboxylate and boric acid are deposited onto the inorganic support material from the second solution, and solvent is removed prior to the chromium salt being deposited onto the inorganic support material from the first solution.

11. The method of claim 1 comprising the steps of:
    i) providing an inorganic support material,
    ii) providing a solution comprising chromium salt, aluminium carboxylate and boric acid in a solvent which is water, $C_1$ to $C_4$ aliphatic alcohol, or a mixture thereof,
    iii) depositing the solution onto the inorganic support material, and
    iv) removing the solvent to form the catalyst precursor comprising chromium salt, aluminium carboxylate and boric acid.

12. A method for preparing an olefin polymerisation catalyst comprising heating a catalyst precursor prepared by the method of claim 1 in a non-reducing atmosphere at a temperature from 200 to 1200° C. for a time period from 30 minutes to 15 hours.

* * * * *